Inventor,
Ansell W. Palmer,
by Francis X. Doyle
His Attorney.

Inventor,
Ansell W. Palmer,
by Francis X. Doyle
His Attorney.

Inventor,
Ansell W. Palmer,
by Francis K. Doyle
His Attorney.

Inventor,
Ansell W. Palmer,
by Francis K. Doyle
His Attorney.

Inventor,
Ansell W. Palmer,
by Francis X. Doyle
His Attorney.

Inventor,
Ansell W. Palmer,
by Francis K. Doyle
His Attorney.

Inventor,
Ansell W. Palmer,
by Francis K. Doyle
His Attorney.

Sept. 29, 1970 A. W. PALMER 3,530,968

TICKET HANDLING AND STORAGE MECHANISM ESPECIALLY USEFUL IN AUTOMATIC FARE COLLECTION SYSTEMS

Filed May 16, 1968 9 Sheets-Sheet 8

Inventor,
Ansell W. Palmer,
by Francis X. Doyle
His Attorney.

Inventor,
Ansell W. Palmer
by Francis K. Doyle
His Attorney.

United States Patent Office
3,530,968
Patented Sept. 29, 1970

3,530,968
TICKET HANDLING AND STORAGE MECHANISM ESPECIALLY USEFUL IN AUTOMATIC FARE COLLECTION SYSTEMS

Ansell W. Palmer, Hampton, N.H., assignor to General Electric Company, a corporation of New York Filed May 16, 1968, Ser. No. 729,615
Int. Cl. G07f *1/06*
U.S. Cl. 194—4 13 Claims

ABSTRACT OF THE DISCLOSURE

A ticket handling and storage mechanism forming part of a passenger gate in an automatic fare collection system. The mechanism includes a ticket transport device, actuated by placing a ticket in the ticket slot of the gate to transport the ticket through the mechanism. A reversing switch is provided to reverse the transport and return the ticket to the slot. A read head, a write head and a punch mechanism are provided to read the information on the ticket, to write desired information on the ticket, and to punch out portions of the ticket to indicate use of the ticket. Storage means are also included for capturing and storing reusable tickets as well as dispensing such reusable tickets. Storage is also provided to capture and discard used tickets that are not reusable.

BACKGROUND OF THE INVENTION

This invention relates to ticket handling and storage means for automatic handling and storage of information coded tickets or cards and, more particularly, to a ticket handling and storage mechanism especially useful in automatic fare collection systems.

In today's society, increased use is being made of credit cards and other types of cards or tokens to charge goods, to determine charges and collect such charges for use of equipment or space and to provide access to or egress from various areas such as parking lots, fairs or other places of amusement and the like. With the proliferation of such cards or tokens many of which are provided with machine sensible coding means an increased need is found for automated means to read, write and store such tokens.

Also, in the transit area, much progress is being made in the use of rapid transit to transport the greatest number of people in the shortest possible time to relieve the congetion of vehicles, particularly in the centers of the larger cities. In most of these systems, it is desirable to provide a graduated fare system such that a passenger using the rapid tranit sytem will pay fare in accordance with the use of the transit system. However, with such transit systems, it is desirable to provide for the automatic collection of such fares. Since an automatic fare collection device for rapid transit systems must be simple to operate, to enable all passengers to readily use such device, it requires a ticket handling and storage mechanism that does not rely on any complex operations by the passenger. Ideally the passenger should only need to present a prepaid ticket to the mechanism to enter the system and present such ticket again to the mechanism to exit from the transit system. All required operations should be performed by the mechanism without any needed assistance from the passenger. The invention disclosed herein in its preferred form is a passenger gate for entrance to and exit from a rapid transit system.

It is therefore one object of this invention to provide a ticket handling and storage mechanism that is actuated by coded tickets and operates on such coded tickets.

A further object of this invention is to provide a ticket handling and storage mechanism which will capture and store reusable coded tickets.

A still further object of this invention is to provide a ticket handling and storage mechanism which will capture and discard used coded tickets which are no longer reusable.

Yet another object of this invention is to provide a ticket handling and storage mechanism which is actuated by a coded ticket and which will read and write coded information on such ticket.

Still another object of this invention is to provide a ticket handling and storage mechanism actuated by a coded ticket for use as a passenger gate in a rapid transit system.

Yet another object of this invention is to provide a ticket handling and storage mechanism which will dispense tickets from storage and code such dispensed tickets.

A still further object of this invention is to provide a ticket handling and storage mechanism actuated by the coded ticket which may operate as either an exit or entrance gate for a rapid transit system.

SUMMARY OF THE INVENTION

In the preferred form of this invention, there is provided a ticket handling and storage mechanism having a ticket transport device actuated by a ticket to carry such ticket through the mechanism. A read head for reading coded information from the ticket and a write head for writing coded information on the ticket are provided along the path of the transport device. A reversible switch is provided for reversing the transport mechanism to return the ticket. In one form, a punch mechanism is provided for punching portions of a ticket as such ticket is used. Storage means are provided including a second transport device for carrying reusable tickets into storage in one mode of operation and dispensing tickets from storage in another mode of operation.

Where the punch device is provided in one form of this invention, a discard storage is provided for discard storing of punched tickets which are not reusable, in another mode of operation.

The invention which is sought to be protected will be particularly pointed out and distinctly claimed in the claims appended hereto. However, it is believed that this invention, and the manner in which its various objects and advantages are obtained, as well as other objects and advantages thereof, will be better undesrtood from the following detailed description of a preferred embodiment thereof, particularly when considered in the light of the accompanying drawings.

DESCRIPTION OF PREFERRED EMBODIMENT

Figures 1, 1A:
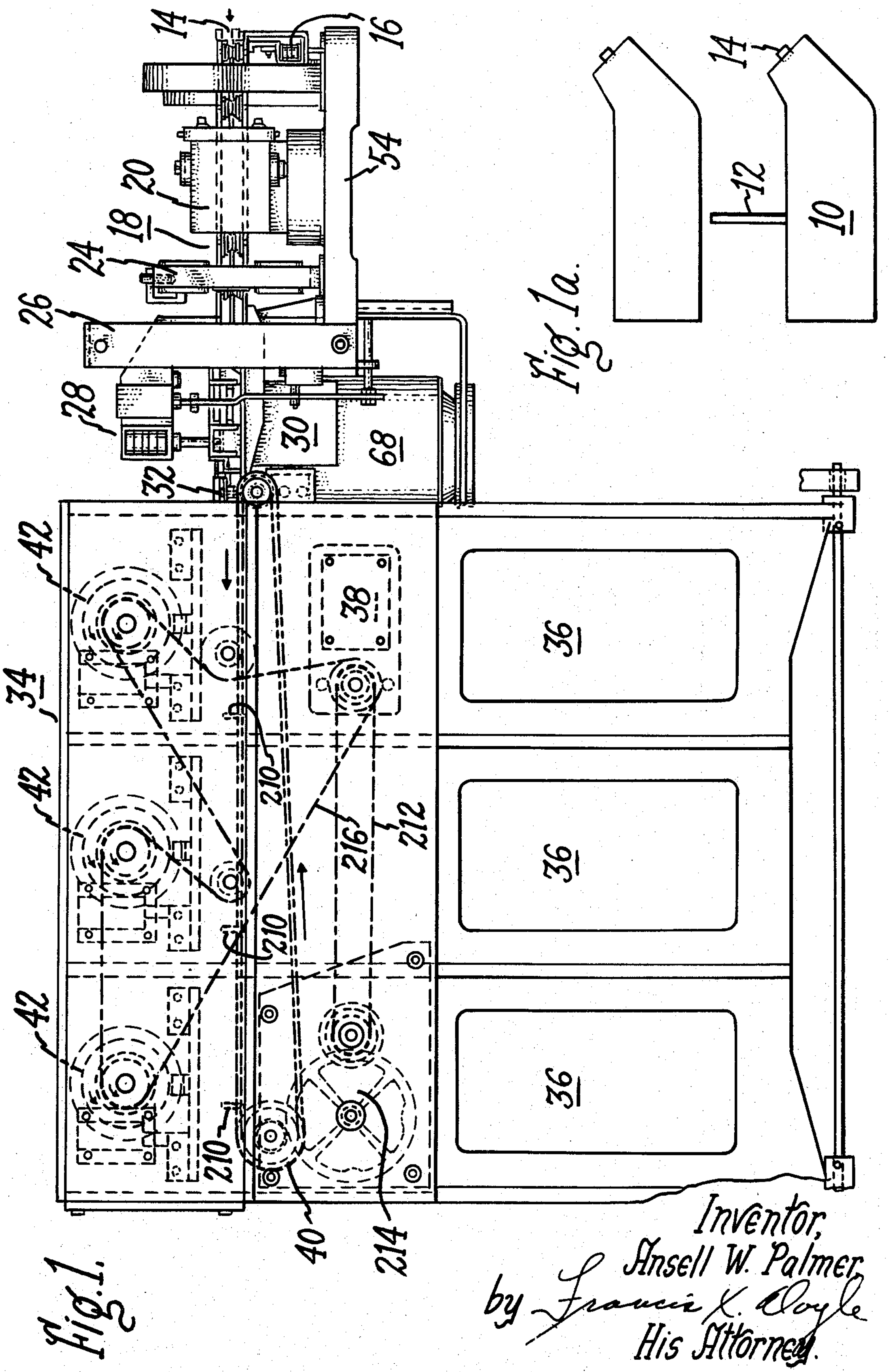
FIG. 1 is a side elevation view of a preferred embodiment of the ticket handling and storage mechanism of this invention.
FIG. 1*a* is a top view of one form of passenger gate using this invention.

As previously discussed, in an automatic fare collective system, it is desired to have ticket handling and storage means which operate to allow the customer or passenger to enter or leave a rapid transit system while requiring as few operations on the part of the passenger as possible. The ticket handling and storing mechanism of this invention merely requires the passenger to present a prepaid ticket to an entrance slot in a passenger gate, then substantially immediately remove such ticket and enter the transit system. At exit, the passenger again presents the ticket to a slot in the passenger gate and if the correct fare has been paid, immediately leaves the transit system. If the ticket is a prepaid ticket having further use by the passenger, it is returned to the passenger prior to exit. If the ticket is reusable, but only on payment of a further fare, or if it is not reusable at all, it is captured by the mechanism and stored for reuse or discarded, if not further usable. For a complete description of the structure and operation of the present preferred embodiment of the ticket handling and storage mechanism, reference will now be made to the drawings, in which like reference numerals are used to indicate like parts throughout the various views thereof.

Figures 2, 3:
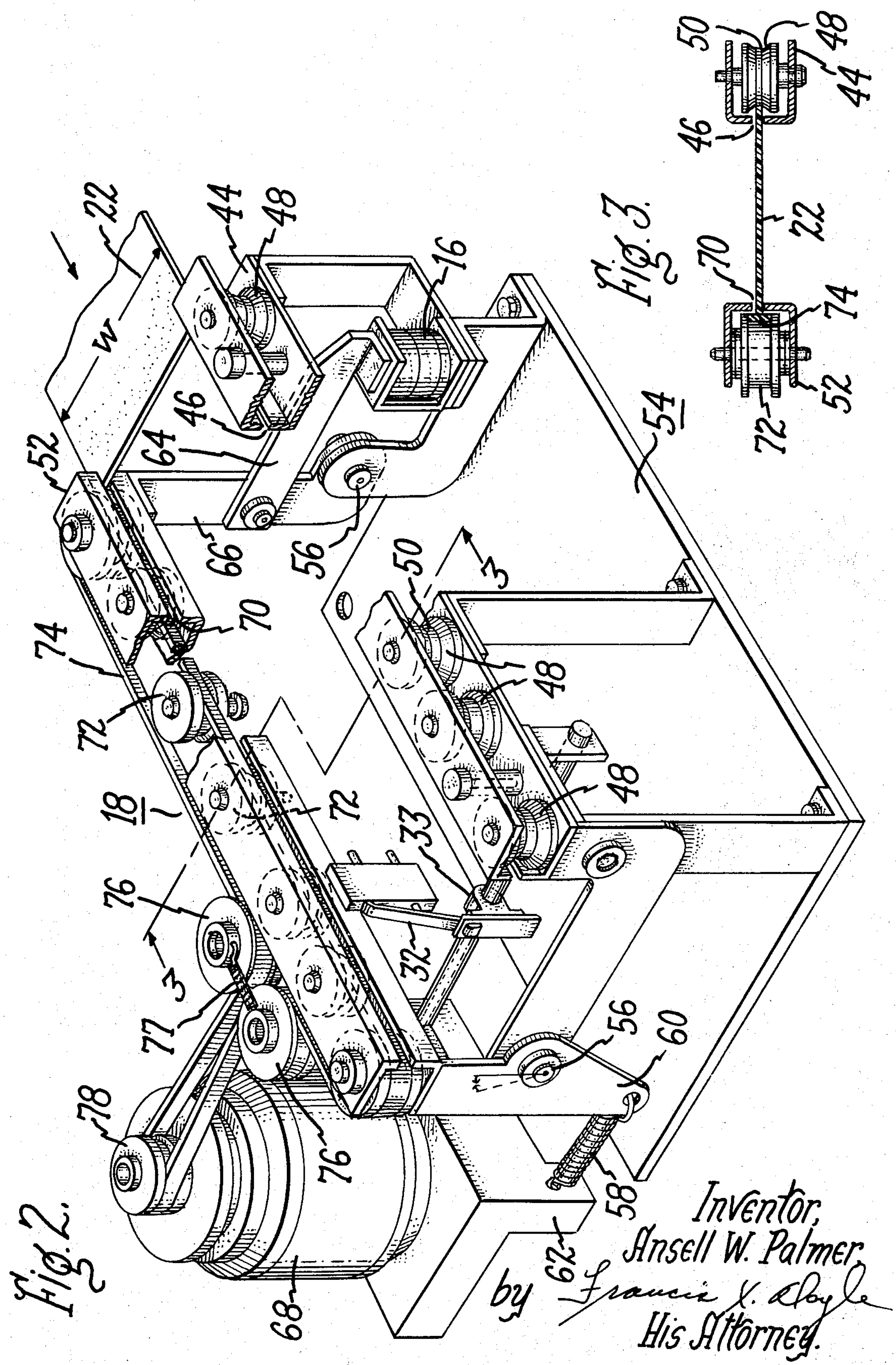
FIG. 2 is a partial perspective view of the ticket transport device according to the preferred embodiment with parts omitted and broken away to more clearly show the preferred construction.
FIG. 3 is a sectional view taken on the line 3—3 of FIG. 2.

Referring first to FIG. 1, there is shown a side elevation view of the preferred embodiment of the ticket handling and storage mechanism of this invention. In the preferred form of this invention the mechanism of FIG. 1 would be assembled into a passenger gate 10, one type of which is shown in FIG. 1*a*, and would function to release a turnstile 12, or other barrier, to allow the passenger to enter or exit from a rapid transit system (not shown). The ticket handling and storage mechanism of FIG. 1 includes an entrance slot 14 for receiving a prepaid ticket and has a ticket sensing device or switch 16 for actuating the ticket transport 18. Included along the path of the ticket transport 18 is a read head 20 for reading information coded on the ticket, such as, for example, ticket 22 (FIG. 2). A write head 24 is also provided for writing information on the ticket. In one form of the invention, beyond the write head 24 along the path of the ticket transport 18 is a punch mechanism 26 which may be used to remove material from a used ticket. If a punch mechanism is used for entrance, then in the exit mode, and located at the same position along the transport 18 as the punch mechanism 26, a capture mechanism 28 is provided for discarding used tickets which are not reusable, such used tickets being discarded into the discard ticket storage 30. A reversing switch 32 is provided at the end of transport 18 to reverse the transport 18 and return the ticket 22 to entrance slot 14.

If the ticket is a single trip, reusable ticket, but one requiring further payment of fare, it is stored in the storage area or storage device 34 after use to exit from the transit system. The storage device 34 includes a plurality of storage cartridges 36 for storing reusable tickets. A driving means 38 is provided in the storage device operating a driving chain 40 and a plurality of cam devices 42 for moving tickets into storage cartridges 36 in the exit mode, and out of the storage cartridges 36 in the entrance mode.

The preferred ticket transport device 18 of this invention is best shown in FIG. 2, to which reference will now be made. FIG. 2 is a partial perspective view of the ticket transport device 18 with parts omitted and broken away to more clearly show the preferred construction. As shown in FIG. 2, ticket transport 18 includes a fixed track 44 having a slot 46 slightly wider than the thickness of ticket 22, slot 46 running the length of fixed track 44. A plurality of rollers 48 are mounted in the fixed track 44, each roller bing provided with a groove 50 (see FIG. 3) for rolling engagement with the edge of ticket 22. The cooperation of ticket 22, slot 46, and groove 50 are clearly shown in the sectional view of FIG. 3. Ticket transport 18 also includes a relatively movable track 52 which is pivoted to the frame 54 of the ticket handling mechanism by pivot pins 56. A loading spring 58 is provided connected between a part 60 of movable track 52 and a part 62 of the frame 54. As will be understood, loading spring 58 biases movable track 52 toward fixed track 44. A lever 64 is secured to leg 66 of movable track 52 and is connected to a portion of a ticket sensing device or switch 16, the main portion of switch 16 being secured to frame 54 as shown. As will be understood, lever 64 provides a stop to prevent movable track 52 from moving too close to fixed track 44 under the influence of loading spring 58. Further, lever 64 cooperates with ticket sensing switch 16 to energize or actuate the ticket transport 18 when a ticket 22 is placed between the fixed track 44 and movable track 52. When lever 64 and switch 16 are in contacting position, biased by the loading spring 58, the distance between the fixed track 44 and movable track 52 is slightly less than the width $w$ of ticket 22. When ticket 22 is inserted between the tracks 44 and 52, movable track 52 is pivited about the pins 56, away from the fixed track 44. This movement is sufficient to close switch 16 and activate the transport drive motor 68.

The movable track 52 includes a slot 70 extending the length thereof. Like slot 46, in fixed track 44, slot 70 in movable track 52 is slightly wider than the thickness of ticket 22. Movable track 52 also includes a plurality of rollers or pulleys 72 and has an endless rubber belt 74 entrained over pulleys 72 between the pulleys 72 and the slot 70 as is clearly shown in FIGS. 2 and 3. Endless belt 74 extends between a pair of idler pulleys or wheels 76 and around the drive pulley 78 mounted on the drive shaft of motor 68. The idler pulleys 76 are spring loaded toward each other by a spring 77 to maintain the desired tension in the belt 74. In the preferred form of the invention, the motor 68 is a permanent, split capacitor motor of the fast reversing type. The ticket 22 is carried along track 44 and track 52 by the tangential drive force created by belt 74 against the edge of the ticket. Should the ticket be stopped during transport for reading, writing or punching, belt 74 will slip about pulley 78 thus eliminating the need for conventional clutches in the system.

A reversing switch 32 is provided at the inner end of fixed track 44. This switch 32 is operated by a tilting, one-way lever 33 operated by tickets moving in the IN direction only. Switch 32 functions to reverse motor 68 and drive ticket 22 back to the entrance slot 14.

Figures 4, 4A:
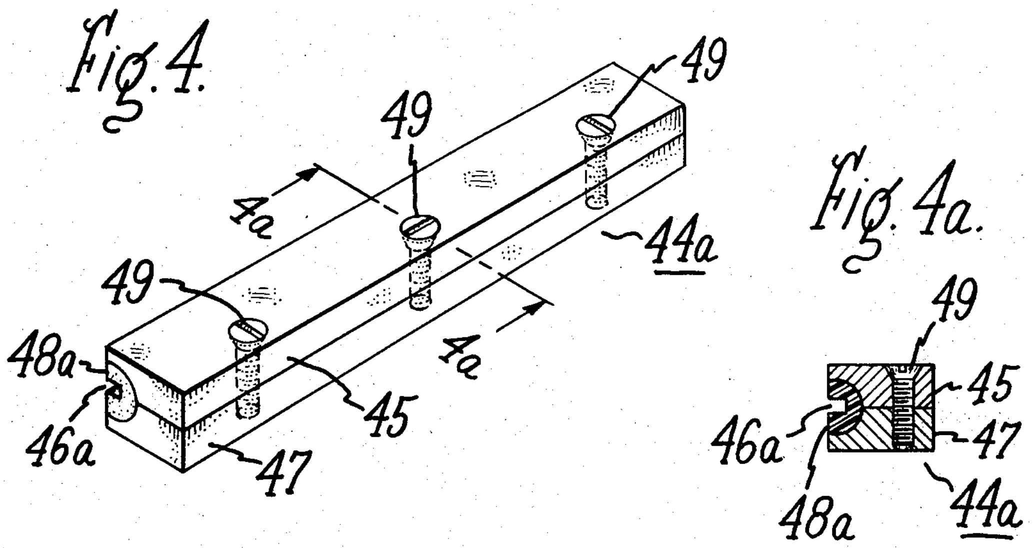
FIG. 4 is a perspective view of a modified form of fixed track.
FIG. 4*a* is a sectional view on the line 4*a*–4*a* of FIG. 4.

Another embodiment of the fixed track 44 is shown in FIGS. 4 and 4*a*. In this embodiment, the slot 46 and rollers 48 are replaced by a slide rail 48*a*. Slide rail 48*a* is made of a long wearing, low friction material, such as an acetal resin having a fluorocarbon film coating. As shown in FIGS. 4 and 4*a*, fixed track **44*a* comprises a pair of bar members 45 and 47, held together by screws 49. Each bar member 45 and 47 has a cutout portion to receive slide rail 48*a* as shown. Slide rail 48*a* is held between bar members 45 and 47 by screws 49, as will be understood. Slide rail 48*a* has a slot 46*a* extending the length thereof, and tickets 22 slide along slot 46*a*, driven by belt 74, in the same manner as in fixed track 44** in FIGS. 2 and 3.

Figure 5:
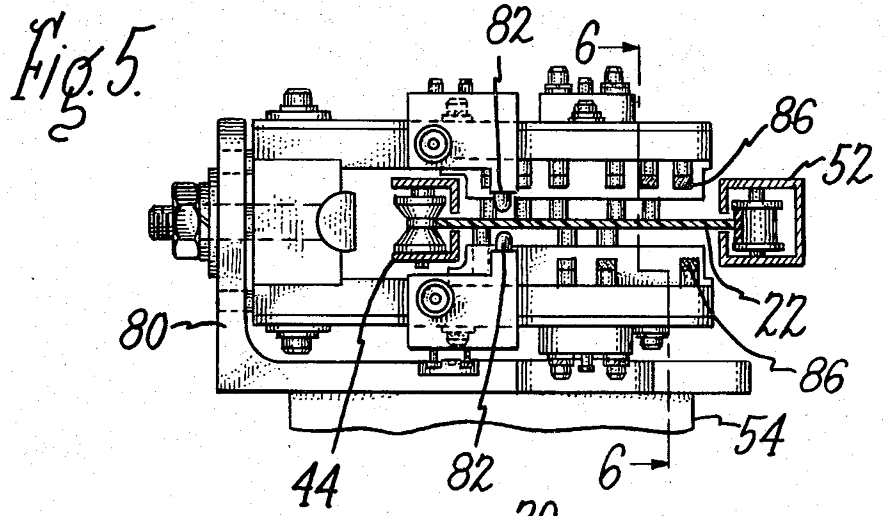
FIG. 5 is an end elevation view of a preferred form of read head.
Figure 6:
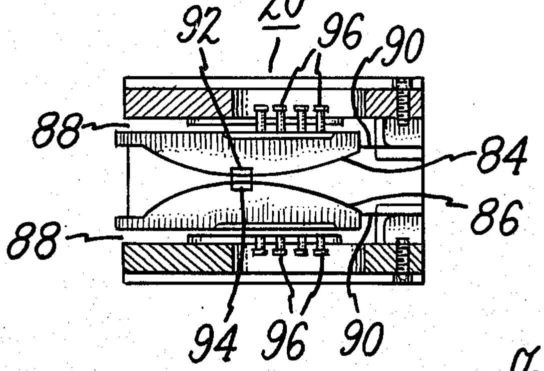
FIG. 6 is a sectional view taken on the line 6—6 of FIG. 5.

FIG. 1 shows the read head assembly 20 mounted along transport 18 to read tickets 22 carried by the transport 18. A preferred form of read head is shown in FIGS. 5 and 6 which are an end view of the read head assembly and a sectional view of a read head thereof. As shown in FIG. 5, read head assembly 20 is secured to a mounting bracket 80 which is fastened to the frame 54 of the ticket handling mechanism. Read head assembly 20 is mounted with a plurality of read heads within the tracks 44 and 52 providing a passage for a ticket 22 as shown in FIG. 5. A photo detection means 82 may be provided within the read head assembly 20 to detect the ticket and energize the read head assembly. FIG. 6 is a sectional view of a preferred form of read head, a plurality of which would be mounted in the read head assembly 20.

As is shown in FIG. 5, each read head comprises a pair of ski shaped members 84, 86 mounted in the read head assembly 20. The rear end of each ski shaped member 84, 86 is free to move up and down in guide opening 88 within the assembly 20. The front end of ski members 84, 86 is secured to flat springs 90 allowing the ski members 84, 86 to separate as a ticket 22 moves through the read head assembly 20. Either Hall devices or induction pickups 92, 94 are mounted in ski members 84, 86 respectively, as sholn. The Hall devices or induction pickups 92, 94 are flush with the surfaces of thet ski members 84, 86 such that as the ticket 22 passes through the read head assembly 20, the outer surface of the Hall devices or induction pickups 92, 94 will be in contact with ticket 22. As will be understood, Hall devices or induction pickups 92, 94 will detect any magnetic areas of ticket 22. The information read from ticket 22 such as, for example, the prepaid fare or the station of origin, or the like will be carried from the Hall devices or induction pickups 92, 94 through the electrical connections 96 by means well known in the art, to an information storage means (not shown). After passing through the read head assembly 20 the ticket goes through the write head 24.

Figures 7, 8:
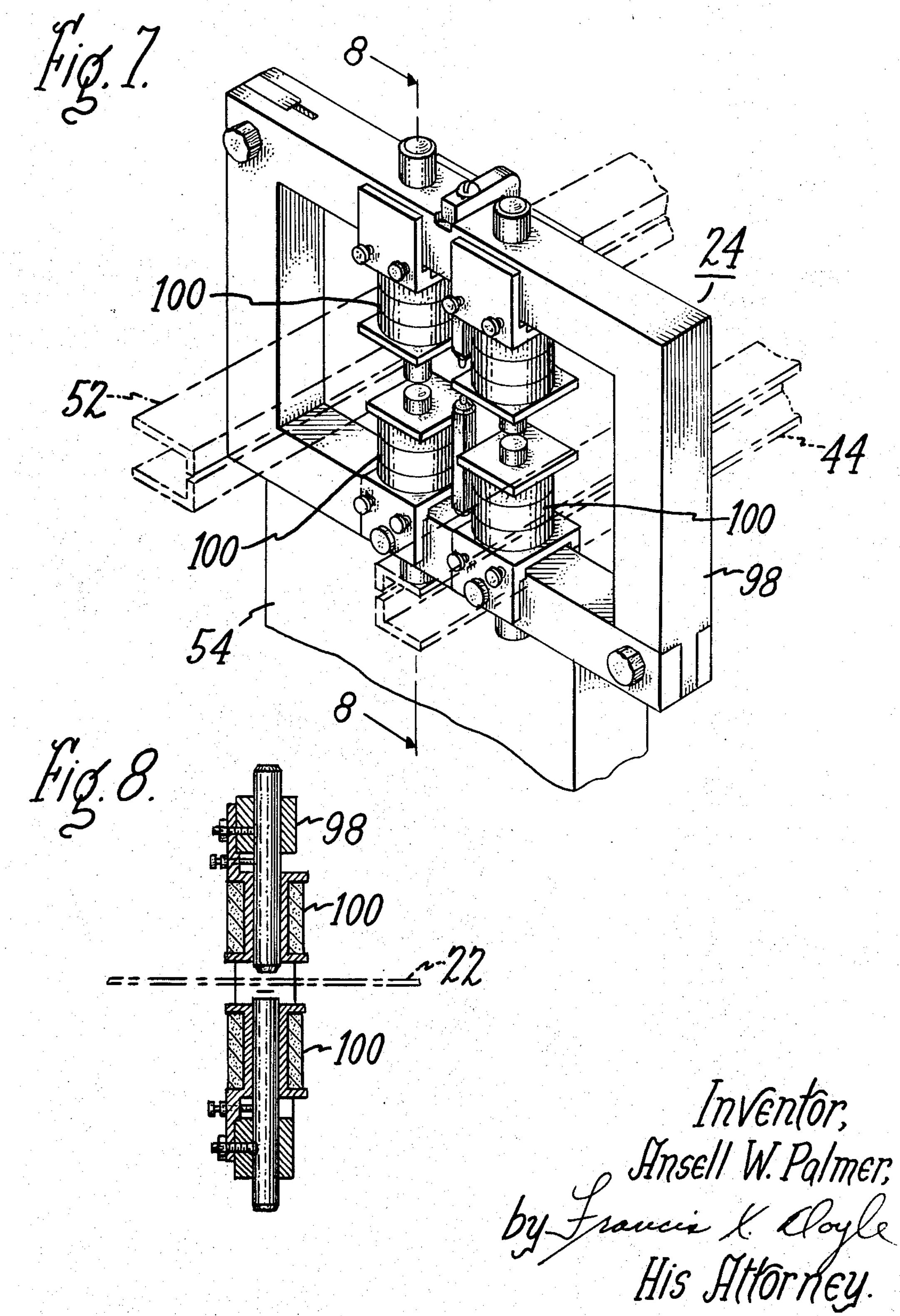
FIG. 7 is a perspective view of the preferred form of write head assembly according to this invention.
FIG. 8 is a sectional view taken on the line 8—8 of FIG. 7.

The write head assembly, according to the preferred form of this invention is shown in FIGS. 7 and 8. FIG. 7 is a perspective view of the preferred write head while FIG. 8 is a sectional view thereof. The write head assembly 24 comprises a mounting member 98 which is secured to frame 54 of the ticket handling mechanism. A plurality of electromagnets 100 are mounted in member 98, four being shown in the preferred embodiment. Mounting member 98 surrounds track 44, 52 shown in phantom lines at FIG. 7, and mounts the electromagnets 100 so that ticket 22 may pass between the opposed electromagnets. This is most clearly shown in FIG. 8 of the drawing where ticket 22 is shown in phantom lines. As will be understood, the electromagnets 100 will magnetize various areas of ticket 22 to provide magnetic coded information, such as station, time of day and fare paid. As will be apparent, the fare paid or other information may be provided from the read head assembly 20 as previously described.

Figure 9A:
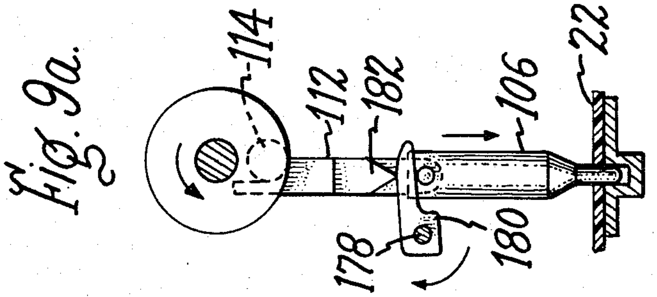
FIG. 9*a* is a partial detached side view showing the operative relation of the punch with a resetting mechanism.
Figure 9:
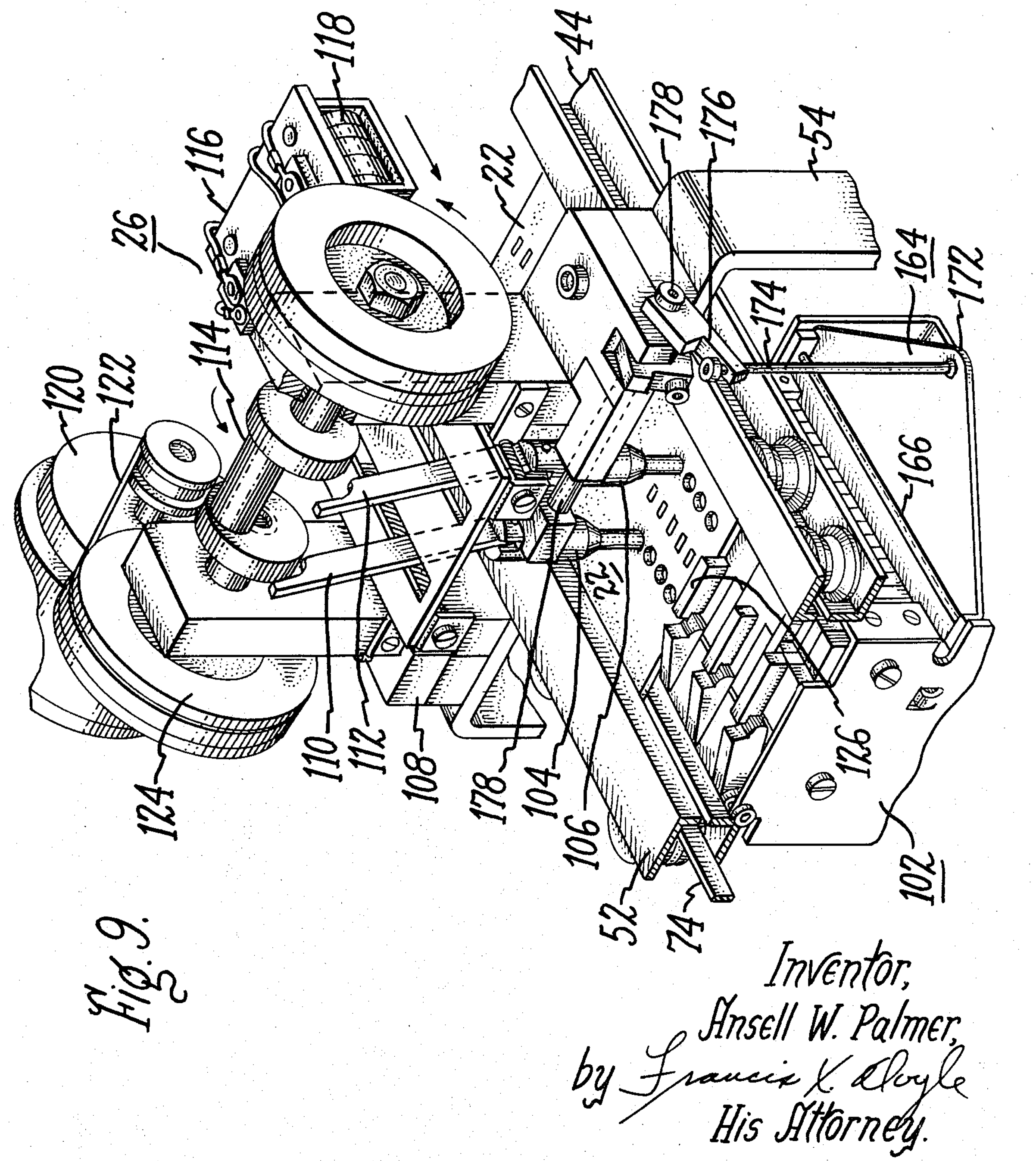
FIG. 9 is a perspective view of a punch mechanism together with a stop assembly for stopping a ticket at an appropriate position under the punch assembly according to the preferred form of this invention.

In some fare collection systems it is desirable to provide punching means in the passenger gate for removing areas of some tickets. For example, some transit systems considered it desirable to provide commuter tickets which will be prepaid for a given number of rides. After each ride the ticket will be punched to eliminate one area of the ticket to show that a ride has been taken. Punching of the ticket will preferably be done on entrance to the system. To provide this function in the ticket handling and storage mechanism of this invention, a punch mechanism 26 is provided along the ticket transport 18. The preferred punch mechanism is best shown in FIGS. 9, 9*a*, 10 and 10*a*, which are perspective views and partial side views of the punch mechanism 26 and a related variable stop assembly 102, respectively. Referring first to FIG. 9, the punch mechanism 26 is shown as including a pair of punches 104, 106 which are mounted in a punch plate 108 which in turn is secured to the frame 54. Obviously, more or less punches could be provided. Punches 104 and 106 are mounted for reciproctiaon in plate 108 and are spring biased in the upward position shown. Each punch 104 and 106 is provided with a pivoted portion 110 and 112, respectively, which cooperates with a punch crank shaft 114 to drive either punch 104 or 106 downward against the spring bias. A pair of punch selector solenoids 116, 118 are provided, either being energized according to the area of the ticket to be punched, for selecting either punch 104, 106 for operation. As will be understood, the read head assembly 20 can determine the position of a magnetized area to be removed, and by so doing, selects the appropriate selector solenoid 116 or 118, to be energized by the variable stop assembly 102 by the action of a ticket 22 against a stop member in the assembly 102 in a manner to be described. The energized solenoid 116 or 118 attracts the pivoted selector arm 110 or 112 bringing it under the crank shaft 114.

A punch drive motor 120 is provided to drive the punch crank shaft 114. Driving is provided from motor 120 by a belt 122 which is entrained over the crank shaft drive wheel 124. The energization of the punch motor 120 is initiated at the read head assembly 20 by the action of a ticket 22 passing under it that requires punching.

Figures 10, 10A:
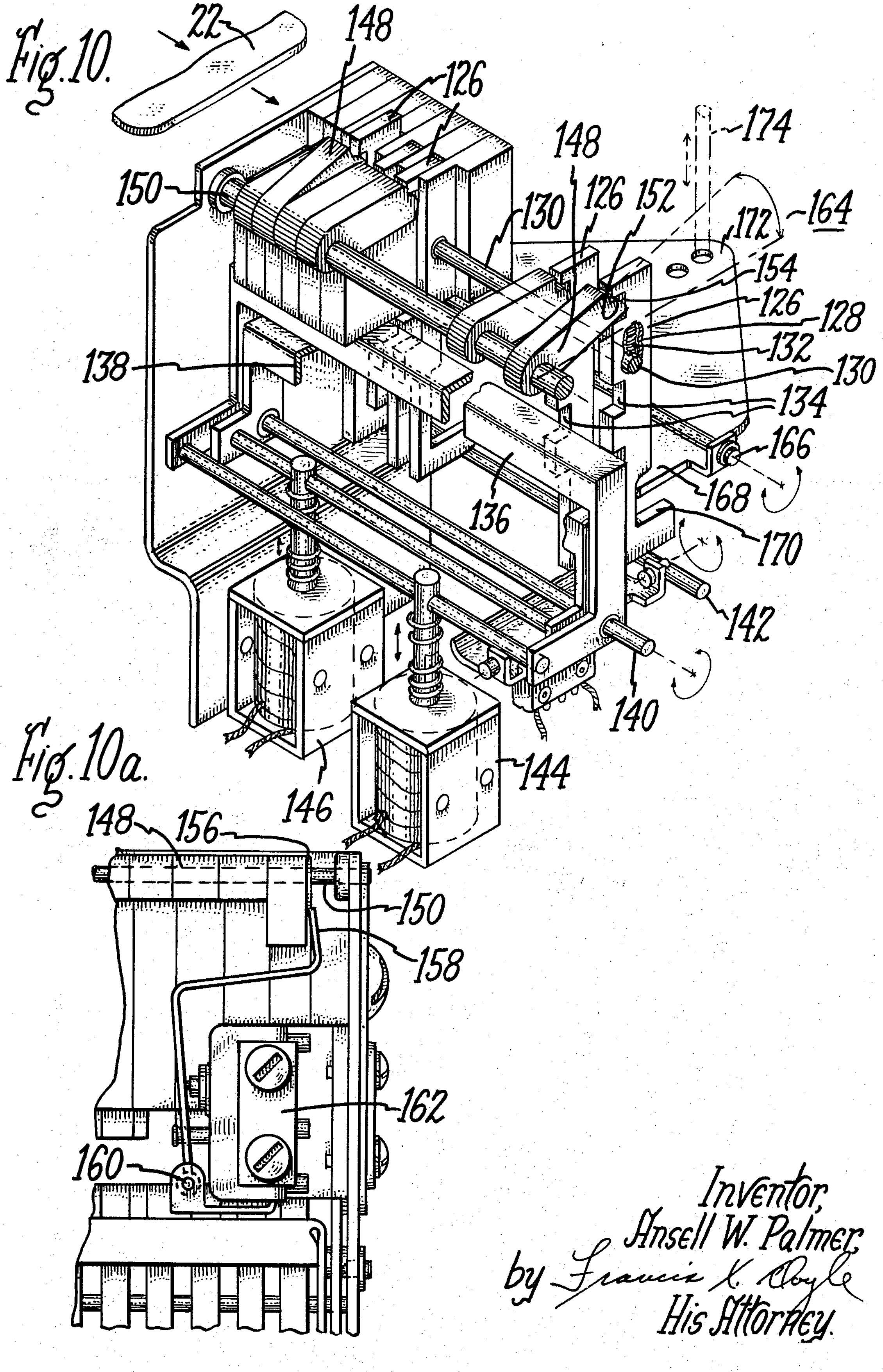
FIG. 10 is a partial perspective view of a preferred form of stop assembly.
FIG. 10*a* is a partial side view of a portion of the stop assembly of FIG. 10.

A variable stop mechanism 102 cooperates with the punch mechanism 26 to position a ticket 22 in the appropriate position under the punch mechanism. Stop mechanism 102, as shown in FIG. 10 comprises a plurality of stop slide bars 126 which are mounted within the stop mechanism 102, by means of slots 128, on a bar 130. The slide bars 126 are driven upward by the driving springs 132 which are mounted in slots 128 and secured to the bar 130. In the preferred embodiment, 12 slide bars 126 are provided each having a locking notch 134 which cooperates with one of four locking bars. Only 2 of the locking bars, 136 and 138, are shown in the drawing. These locking bars hold the slide bars 126 in the lower or locked position. Each locking bar is pivotally mounted, bars 136 and 138 being pivoted about a pivot pin 140 while the other locking bars (not shown) are pivotally mounted on the other side of the stop assembly 102 about the pivot pin 142. Each locking bar is rocked about its pivot by a solenoid, such as solenoid 144, for locking bar 136 and solenoid 146 for locking bar 138. The other two solenoids are on the other side of the stop assembly 102 and are not shown in the drawing. As will be understood, as the locking bars are pivoted about pins 140 and 142 the various slide bars 126 held by the locking bars in the notches 134 are released and rise to the stop position such as the two raised slide bars 126 shown in FIG. 9.

The four solenoids and locking bars operate as a binary decoder to release the various slide bars 126 to provide stops in any one of twelve predetermined positions. The signals for the solenoid will be initiated from the read head assembly 20 which will cause the appropriate solenoids to be energized to place the proper slide bar 126 in the predetermined stop position.

Each slide bar 126 has associated therewith an actuating bar 148. The bars 148 are pivotally mounted on rod 150 which is slidably mounted in the case of the stop assembly 102. Each actuating bar 148 has a nose portion 152 fitting into a notch 154 of a slide bar 126. Thus when a slide bar 126 is raised, the associated actuating bar 148 will also be raised, pivoting about the rod 150. As is best shown in FIG. 10*a,* all the actuating bars 148 are mounted along rod 150 substantially contacting each other. A locking snap ring 156 is placed on rod 150 after the last actuating bar 148, thus fixing the actuating bars 148 to the rod 150. As will be noted, each actuating bar 148 is wider than its associated slide bar 126 (see FIGS. 9 and 10) and spring switch member 158 holds the actuating bars 148 and rod 150 in the forward positoin, toward the end of the stop assembly 102 nearest the write head assembly 24, (to the right as viewed in FIG. 1). Since the actuating bars 148 are wider than slide bars 126, the raised actuing bar 148 will have its leading edge ahead of the leading edge of the associated slide bar 126. Thus a ticket 22 entering the punch mechanicm 126 and the stop assembly 102 along the tracks 44, 52 will first engage the leading edge of the raised actuating bar 148 and move it to the rear before coming to a stop against the raised slide bar 126. As can be seen from FIG. 10*a,* movement of the actuating bar 148 to the rear (right in FIG. 10*a*) will push switch spring 158 to the right pivoting about the pivot point 160 actuating the switch 162. Switch 162 is the punch selector solenoid initiating switch so that a card or ticket 22 will actuate the appropriate punch selector 110 or 112 whenever a slidebar 126 is raised to stop a ticket 22 for punching.

As the punch mechanism 126 operates, to punch ticket 22, it acts to automatically reset stop assembly 102. Stop assembly 102 has a reset plate 164 which is pivotally mounted about pivot pin 166 mounted in the sides of stop assembly 102. Reset plate 164 has a reset portion 168 which extends into notches 170 of the slide bars 126. As the front portion 172 of reset plate 164 is raised, plate 164 will pivot about pin 166 and reset portion 168 will move downwardly engaging notches 170 of any slidebar 126 in the raised position, resetting the slide bars 126. The mechanism for resetting is shown in FIG. 9 as a reset rod 174 having one end attached to portion 172 of the reset plate 164. The other end of the reset rod 174 is secured to a reset crank 176. Reset crank 176 is fixed to a shaft 178 which is rotatably mounted in the plate 108 of the punch mechanism 26. Shaft 178 is provided with fixed cam 180 which cooperates with cams 182 mounted on the punch selectors 110 and 112. The operation of the cams is shown in FIG. 9*a*. As there shown, as punch 106 is moved downwardly to punch ticket 22, cam 182 on punch selector 110 engages cam 180 on shaft 178. This causes the shaft 178 to rotate clockwise as indicated by the arrow. Rotation of shaft 178 rotates the reset arm 176 clockwise thereby lifting the forward portion 172 of the reset plate 174. The action of lever 174 lifting the reset plate 164 resets the raised slide bars 126 through the reset end 168 of reset plate 164. When punch 106 is raised after punching the ticket 22 the slidebars 126 will have been reset and the ticket 22 is again moved along the tracks 44, 52 by the belt 74.

Figure 11:
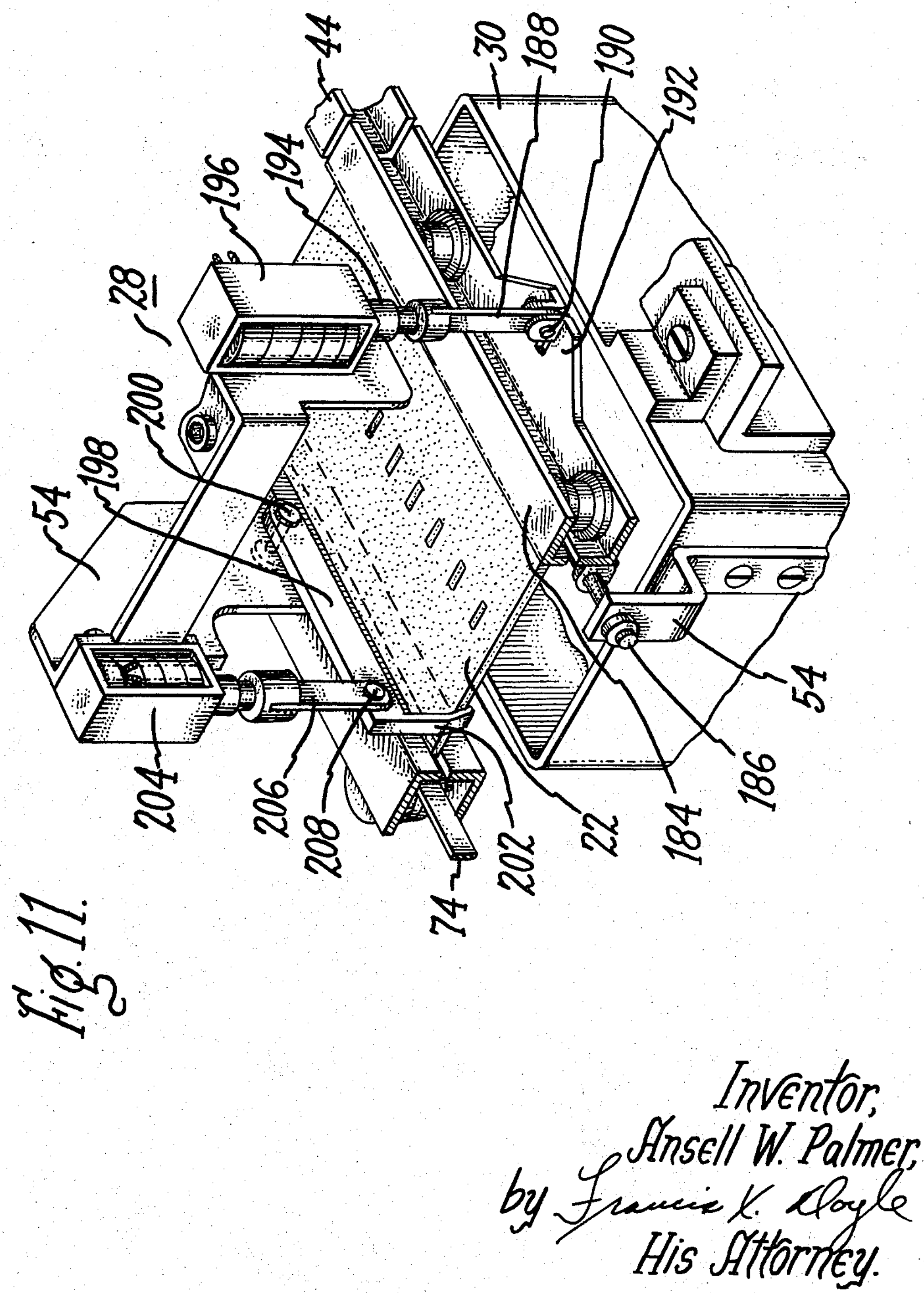
FIG. 11 is a perspective view of a ticket capture mechanism according to the preferred embodiment of this invention.

When a punch mechanism 26 is provided, such as for entrance to the transit system, then in the exit mode of the passenger gate 10 a capture and discard mechanism 28 is provided for discarding tickets 22 after the final punch has been made to such tickets. This mechanism is best shown in FIG. 11 of the drawing which is a perspective view of the preferred mechanism. As shown in FIG. 11, a portion 184 of fixed track 44 is separate from the rest of the track and is pivotally mounted to the frame 54 by pivot pin 186. A tilting arm 188 is pivotally attached at one end by the pin 190 to the lifting portion 192 of the track section 184. The other end of tilting arm 188 is connected to armature 194 of a solenoid 196. When solenoid 196 is actuated, tilt arm 188 is raised pivoting the track 184 about pin 186 and dumping the ticket 22 into the discard bin 30.

A stop lever 198 is provided in conjunction with the capture and discard mechanism 28. The stop lever 198 is pivoted at one end to frame 54 by a pivot pin 200. The opposite end of lever 198 has a tab 202 which can be moved into the path of ticket 22 as shown. The lever 198 is raised or lowered by means of a solenoid 204 and arm 206 which is pivotally connected to lever 198 by a pivot pin 208. As will be understood, solenoid 204 may be operated by a signal from read head assembly 20 removing the stop lever 198 and tab 202 from the position to stop ticket 22. The same signal deactivates a switch that would otherwise energize solenoid 196 thereby pivoting track 184 and dumping ticket 22 into discard bin 30 when ticket 22 engages tab 202.

From the above description of the ticket handling and transport mechanism it is believed that the operation of this portion of the invention will be clear. It will also be clear that the various mechanisms may operate either as an entrance passenger gate or an exit passenger gate. For example, on entrance a passenger will insert a prepaid ticket 22 into slot 14. The entrance of the ticket in slot 14 will energize transport 18 to carry the ticket 22 into the gate. The ticket will be read by read head assembly 20 as to the fare paid and this information will be fed through the necessary information buffering electronics to write head assembly 24. At the write head assembly, the ticket will be coded as to fare paid, entrance station, time of day and any other desired information. After the write head assembly 24, or before reaching write head assembly 24, if desired, the ticket 22 may be stopped at punch mechanism 26 where an appropriate area will be removed from the ticket 22 if of the commuter type. Ticket 22 will then move down transport 18 to reverse switch 32 which would reverse transport 18 and return the ticket 22 to the passenger through the slot 14. When the passenger removes the ticket, the turnstile 12 will open and allow the passenger to enter the transit system.

On exit operation, the ticket 22 will again be placed in slot 14 actuating transport 18. The ticket 22 is carried to read head assembly 20 which reads the prepaid fare, the entrance station and other information and determines if sufficient fare has been paid for the ride taken. The ticket 22 will then advance to the write head assembly 24 where the prepaid fare less the value of the ride just taken may be rewritten if the ticket is a commuter type to be returned to the passenger. Of course, if the ticket is used up on such ride, it will be discarded by the discard ticket mechanism 28. Otherwise the ticket will actuate reverse switch 32 and return ticket 22 to the passenger. After recovering ticket 22 the turnstile 12 will unlock allowing the passenger to leave the transit system. If the ticket is captured by the mechanism, the turnstile 12 will also be unlocked to allow the passenger to leave.

For single ride tickets, a caputre and storage device 34 is provided. Capture and storage device 34, as shown in FIG. 1, will take tickets from the end of transport 18 and feed them into a plurality of storage cartridges 36. As will be understood, during the exit mode operation of the passenger gate shown in FIG. 1*a*, read head assembly 20 will recognize a reusable single trip ticket and provide a signal to override the transport reversing switch 32 and energize the drive motor 38 to operate the capture and storage mechanism 34. A drive chain 40 is provided in mechanism 34 driven by the drive motor 38. As shown in FIG. 1, drive chain 40 is provided with a plurality of drive cogs 210 which are spaced along the drive chain 40, the length of ticket 22. Chain 40 is driven from motor 38 by a belt 212 and a Geneva mechanism 214 which will advance chain 40 by steps to position the ticket 22 directly in front of one of the storage cartridges 36 for storage therein. Motor 38 also drives a plurality of cam devices 42 through a belt 216 to move tickets 22 from the chain drive 40 into the storage cartridges 36. The preferred constuction and operation of the cams and related equipment is best shown in FIGS. 12 and 13 to which reference will now be made.

Figure 12:
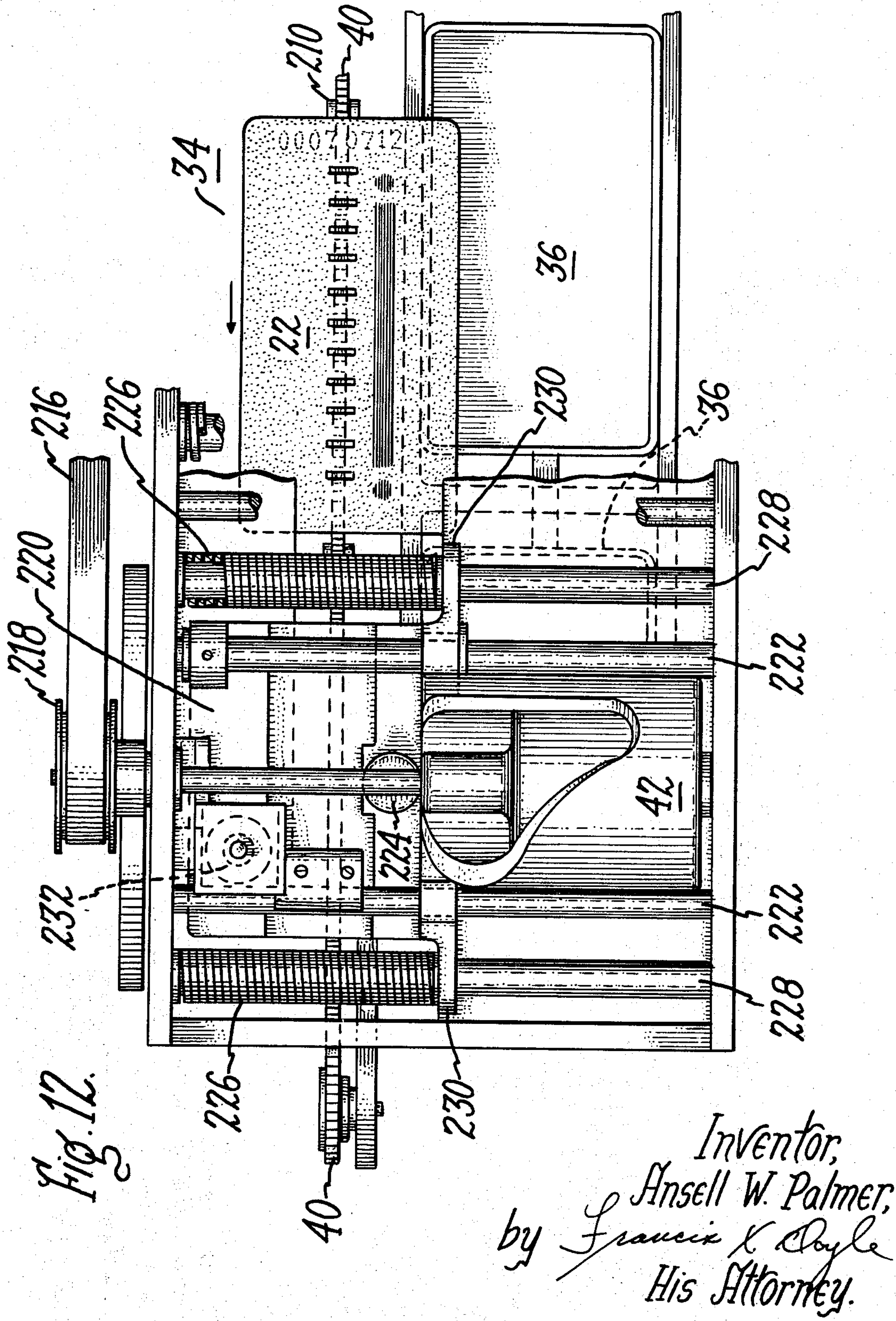
FIG. 12 is a top view of one portion of the preferred capture and storage mechanism.
Figures 13, 14:
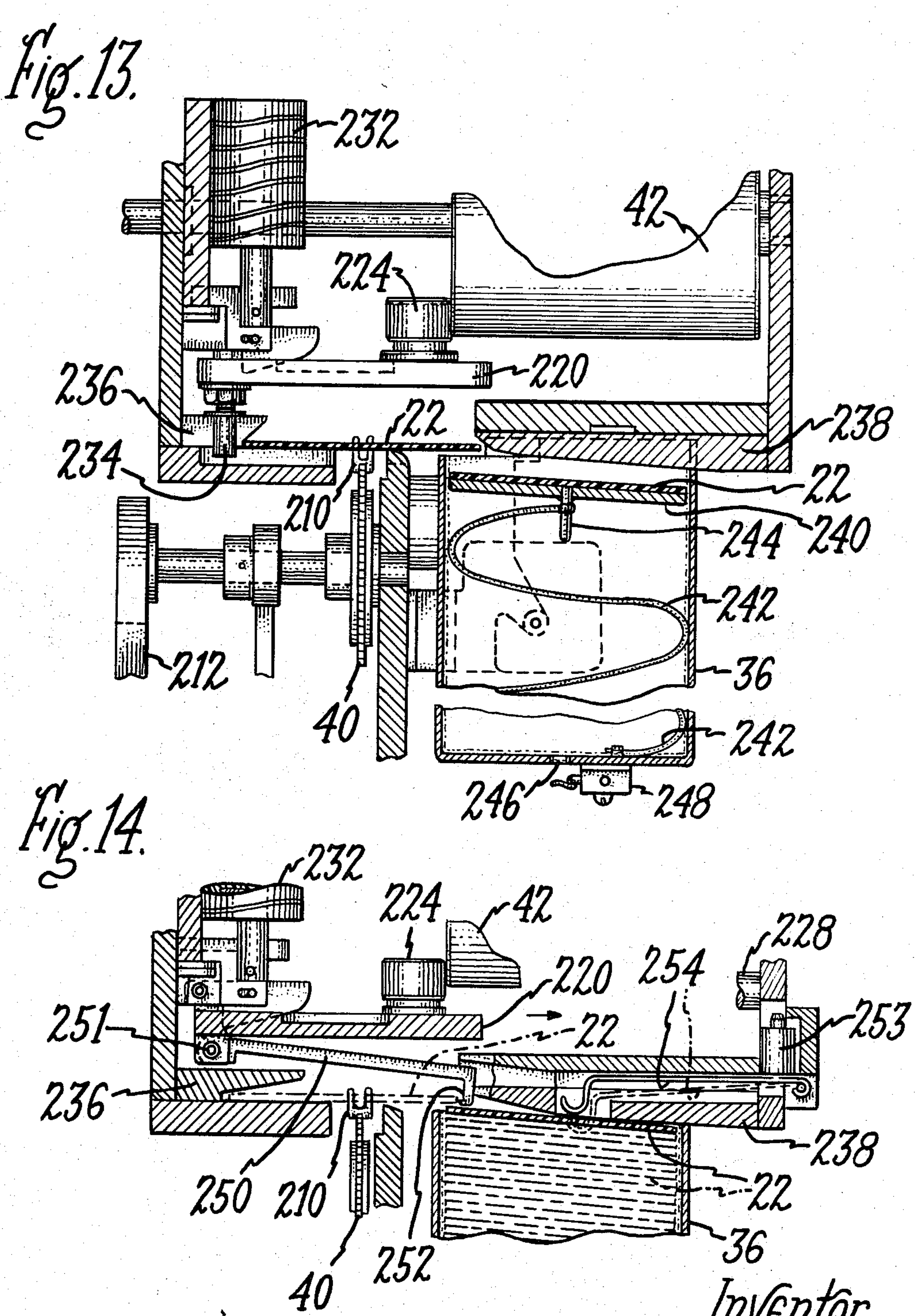
FIG. 13 is a partial sectional side view of the portion of the capture and storage mechanism of FIG. 12.
FIG. 14 is a partial sectional side view similar to FIG. 13, showing another mode of operation.

FIG. 12 is a top view of a portion of the capture and storage mechanism 34 showing the relation of cam 42 and cross slide device 220 which cooperates with cam 42 to place ticket 22 into a storage cartridge 36. FIG. 13 is a partial sectional side view of the mechanism of FIG. 12. As shown in FIG. 12, the cam 42 is rotatably mounted in the housing of mechanism 34 and is provided with a pulley 218 at one end, over which drive belt 216 is entrained. A cross slide member 220 is also provided, slidable on a pair of slide shafts 222 and carrying a cam follower 224. Cam follower 224 is held against cam 42 by the cross slide drive springs 226 which are mounted on shafts 228 and are compressed between tabs 230 on cross slide 220 and the housing of mechanism 34. A solenoid 232 is provided which locks the cross slide 220 in the position shown and is energized when a ticket 22 is in position to allow cross slide 220 to feed the ticket 22 in the cartridge 36. As is shown in FIG. 13, cross slide 220 is provided with two depending portions 234 which engage ticket 22. As cam 42 rotates with the cross slide 220 unlatched, cam follower 224 will follow the cam profile shown in FIG. 12. The cross slide 220 will move across the drive chain 40 under the influence of drive springs 226 carrying the two depending portions 234 away from the fixed guide rail 236. This action will move ticket 22 against the slope head 238 above cartridge 36 placing the ticket into such cartridge 36. Storage cartridges 36 are provided with lift plates 240 which are spring mounted in cartridges 36 by spring 242. Spring 242 is designed to just offset the weight of tickets 22 as they are stored in cartridge 36. Lift plate 240 is provided with a rod member 244 extending below the plate 240, as shown. As cartridge 36 is filled with tickets 22 rod 244 will extend from opening 246 in the base of cartridge 36 and actuate a switch 248. Switch 248 serves to indicate that the cartridge 36 is full and start the filling of the next adjacent cartridge 36. Of course, it will be apparent that as the cam 42 continues rotation, after the cross slide 220 has placed the ticket in cartridge 36, the cross slide 220 will be moved back across drive chain 40, compressing the drive springs 226 and relatching the cross slide 220 in the solenoid 232.

Of course, it will be apparent that the capture and storage mechanism 34 may also be used to feed tickets into transport 18 for use by passengers when the passenger gate of FIG. 1*a* is used as an entrance to a rapid transit system. In such use, the cross slide 220 would be as shown in FIG. 14 and would take tickets from storage cartridge 36 and feed them to the chain drive 40. A pair of drag links 250 are provided, pivoted on cross slide 220 by pivot pins 251, as shown in FIG. 14. The solenoid 232 is energized to unlock cross slide 220 to remove a ticket 22 from a storage cartridge 36. When cross slide 220 is released and cam 42 rotates, springs 226 move cross slide 220 over the cartridge 36 and drive drag links 250, and their depending portions 252 between the top ticket 22 in storage cartridge 36 and slope head 238 above cartridge 36. At the end of this movement of cross slide 220 against cam 42, drag link portions 252 will engage the outer edge of top ticket 22. As cam 42 continues to rotate cam follower 224 and cross slide 220 moves back toward drive chain 40, carrying drag links 250 and the tickets 22 engaged by drag link portions 252, over drive chain 40 and pull the ticket 22 against the fixed rail 236. The feed mechanism is designed to maintain tickets 22 in chain drive 40, such that a ticket 22 will be substantially immediately available to a fare paying passenger. A switch 253 is provided in association with each storage cartridge 36, having a switch arm 254, pivoted as shown. When a cartridge 36 is emtpy, arm 254 is pivoted upwardly to operate switch 253. Switch 253 will operate the feeding mechainsm of another storage cartridge 36, to start feeding of tickets 22 out of such other storage cartridge 36. From the above description it will be apparent that when operated in the entrance mode the capture and storage mechanism 34 will provide tickets 22 in chain drive 40, ready for dispensing to a fare paying passenger. On payment of a given fare, the ticket 22 would move from chain drive 40 into transport 18, be written with fare paid, station and like information by write head assembly 24 and fed out the ticket slot 14 to the passenger.

While the preferred mechanisms for the ticket handling and storage mechanism of this invention has been shown and described, the specific electrical connections have not been shown. However, it is believed that from the above description it will be apparent to those skilled in the art that any of a variety of known electrical connections could be provided, as desired, according to the particular mechanisms used in the handling and storage system.

From the above description of the present preferred embodiment of the ticket handling and storage mechanism of this invention, it is believed that those skilled in the art will readily understand its many advantages for use in an automatic fare collection system of a rapid transit system. Of course, it will be obvious that all of the many elements need not be present in every system. For example, it will be readily apparent that the punch mechanism and variable stop assembly may be eliminated where punching of tickets is unnecessary. In other systems it may be desirable to capture all tickets by means of the pivoted track capture mechanism without use of the capture and storage mechanism shown. Also, many changes in the constructional details of the disclosed preferred embodiment will occur to those skilled in the art. It will be apparent that many such exchanges may be made without departing from the spirit and scope of the invention as it is defined in the appended claims.

What is claimed as new and which it is desired to be secured by Letters Patent of the United States is:

1. A ticket handling and storage mechanism comprising in combination:

(a) a ticket transport mechanism
  (1) a ticket sensing switch for sensing a ticket and actuating said ticket transport mechanism,
(b) a read head assembly mounted along said ticket transport mechanism for reading tickets carried by said ticket transport mechnism;
(c) a write head assembly mounted along said ticket transport mechanism beyond said read head assembly for writing information on tickets carried by said ticket transport mechanism;
(d) a reversing switch mounted on said ticket transport mechanism beyond said write head assembly, said reversing switch actuated by a ticket carried by said ticket transport mechanism to reverse said ticket transport mechanism.

2. A ticket handling and storage mechanism as claimed in claim 1 in which said ticket transport mechanism comprises a pair of track members having ticket and edge receiving slots extending the length thereof, one of said pair of tracks provided wtih ticket edge engaging rollers, and the other of said tracks having an endless belt extending along said other track to engage in driving relation the edge of a ticket received in said ticket receiving slot of said other track.

3. A ticket handling and transport mechanism as claimed in claim 2 in which said other track is a movable track, spring biased toward said one track, said movable track being moved away from said one track by entry of a ticket within said ticket receiving slots of said movable track and said one track and in which said ticket sensing switch is a switch actuated by movement of said movable track.

4. A ticket handling and storage mechanism as set forth in claim 1 in which:

(e) a ticket punching mechanism and stop assembly are provided mounted along said ticket transport mechanism;
  (1) said punching mechanism comprising at least one punch member operated by a punch crank to move said punch member into punching engagement with a ticket carried by said ticket transport mechanism;

(2) said stop assembly comprising a plurality of slide bar members actuated by a plurality of solenoid devices for selectively placing a predetermined slide bar member in ticket stopping relation with a ticket carried by said ticket transport mechanism.

5. A ticket handling and storage mechanism as claimed in claim 4 in which said stop assembly is provided with a plurality of actuating bars, each of said plurality of actuating bars pivotally associated with one of said slide bar members, said actuating bars being slidable with respect to said slide bar members, and a punch switch actuated member, said punch switch actuated member activated by movement of one of said actuator bars for actuating said punch mechanism.

6. A ticket handling and storage mechanism comprising in combination:

(a) a ticket transport mechanism;
  (1) a ticket sensing switch connected in said ticket transport mechanism for sensing a ticket inserted in said ticket transport mechanism for actuating said ticket transport mechanism;
(b) a read head assembly mounted along said ticket transport mechanism for reading tickets carried by said ticket transport mechanism;
(c) a write head assembly mounted along said ticket transport mechanism for writing information on said tickets carried by said ticket transport mechanism;
(d) a ticket capture and storage mechanism mounted at the end of said ticket transport mechanism, said ticket capture and storage mechanism including a chain drive member for capturing tickets from said ticket transport mechanism and including cam and cross slide members for moving captured tickets from said chain drive into storage cartridges.

7. A ticket handling and storage mechanism comprising in combination:

(a) a ticket transport mechanism,
  (1) a ticket sensing switch connected in said ticket transport mechanism for sensing a ticket inserted in said ticket transport mechanism for actuating said ticket transport mechanism;
(b) a read head assembly mounted along said ticket transport mechanism for reading tickets carried by said ticket transport mechanism;
(c) a write head assembly mounted along said ticket transport mechanism for writing information on said tickets carried by said ticket transport mechanism;
(d) a ticket feed and storage mechanism mounted at the end of said transport mechanism, said ticket feed and storage mechanism including a chain drive member for feeding tickets into said transport mechanism, and including cam and cross slide member for moving tickets from storage cartridges onto said chain drive by the use of pivoting drag links.

8. A ticket handling and storage mechanism as claimed in claim 7 in which said ticket transport mechanism comprises a pair of track members having ticket edge receiving slots extending the length thereof, one of said pair of tracks provided with ticket edge engaging rollers, and the other of said tracks having an endless belt extending along said other track to engage in driving relation the edge of a ticket received in said ticket receiving slot of said other track.

9. A ticket handling and transport mechanism as claimed in claim 8 in which said other track is a movable track, spring biased toward said one track, said movable track being moved away from said one track by entry of a ticket within said ticket receiving slots of said movable track and said one track and in which said ticket sensing switch is a switch actuated by movement of said movable track.

10. A ticket handling and storage mechanism as set forth in claim 7 in which:

(e) a ticket punching mechanism and stop assembly are provided mounted along said ticket transport mechanism,
  (1) said punching mechanism comprising at least one punch member operated by a punch crank to move said punch member into punching engagement with a ticket carried by said ticket transport mechanism;
  (2) said stop assembly comprising a plurality of slide bar members actuated by a plurality of solenoid devices for selectively placing a predetermined slide bar member in ticket stopping relation with a ticket carried by said ticket transport mechanism.

11. A ticket handling and storage mechanism as claimed in claim 10 in which said stop assembly is provided with a plurality of actuating bars, each of said plurality of actuating bars pivotally associated with one of said slide bar members, said actuating bars being slidable with respect to said slide bar members, and a punch switch actuated member, said punch switch actuated member activated by movement of one of said actuator bars for actuating said punch mechanism.

12. A ticket handling and storage mechanism comprising, in combination:

(a) a ticket transport mechanism, said ticket transport mechanism comprising a pair of track members for transporting a ticket member,
(b) a read head assembly mounted along said ticket transport mechanism for reading tickets carried by said ticket transport mechanism,
(c) a capture and discard mechanism for discarding used tickets, said capture and discard mechanism comprising a pivoted track portion, a stop lever for engaging a ticket and maintaining it in said pivoted track portion and a solenoid operated tilting arm connected to said pivoted track portion for pivoting said pivoted track portion and discarding a ticket from said ticket transport mechanism.

13. A ticket handling and storage mechanism as claimed in claim 12 in which a reversing switch is mounted on said ticket transport mechanism beyond said pivoted track portion, said reversing switch actuated by a ticket carried by said ticket transport mechanism for reversing the operation of said ticket transport mechanism.

References Cited

UNITED STATES PATENTS

| | | | |
|---|---|---|---|
| 2,995,976 | 8/1961 | Weingart. | |
| 3,254,749 | 6/1966 | Scherer | 194—4 |

ALLEN N. KNOWLES, Primary Examiner

U.S. Cl. X.R.

209—73